US012664761B2

(12) United States Patent (10) Patent No.: US 12,664,761 B2
Yamamoto et al. (45) Date of Patent: Jun. 23, 2026

(54) TRAINED MODEL CREATION METHOD USING MACHINE LEARNING USED TO PERFORM A SEGMENTATION PROCESS ON A CELL IMAGE AND TRAINED MODEL CREATION SYSTEM USING MACHINE LEARNING USED TO PERFORM A SEGMENTATION PROCESS ON A CELL IMAGE

(71) Applicant: SHIMADZU CORPORATION, Kyoto (JP)

(72) Inventors: Shuhei Yamamoto, Kyoto (JP); Ryuji Sawada, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 274 days.

(21) Appl. No.: 18/290,036

(22) PCT Filed: Jan. 31, 2022

(86) PCT No.: PCT/JP2022/003699
§ 371 (c)(1),
(2) Date: Nov. 9, 2023

(87) PCT Pub. No.: WO2022/239316
PCT Pub. Date: Nov. 17, 2022

(65) Prior Publication Data
US 2024/0257502 A1 Aug. 1, 2024

(30) Foreign Application Priority Data

May 11, 2021 (JP) ................................. 2021-080479

(51) Int. Cl.
*G06V 10/774* (2022.01)
*G06V 10/776* (2022.01)
*G06V 20/69* (2022.01)

(52) U.S. Cl.
CPC .......... *G06V 10/774* (2022.01); *G06V 10/776* (2022.01); *G06V 20/695* (2022.01)

(58) Field of Classification Search
CPC .. G06V 10/774; G06V 10/776; G06V 20/695; G06V 20/698; G06T 1/00; G06T 7/00
See application file for complete search history.

(56) References Cited

U.S. PATENT DOCUMENTS

| | | | |
|---|---|---|---|
| 2020/0193219 A1* | 6/2020 | Namiki | ................. G06F 18/214 |
| 2022/0189149 A1 | 6/2022 | Shiraishi | |

(Continued)

FOREIGN PATENT DOCUMENTS

| | | |
|---|---|---|
| JP | 2020-030692 A | 2/2020 |
| WO | 2019/171453 A1 | 9/2019 |
| WO | 2021/059572 A1 | 4/2021 |

OTHER PUBLICATIONS

Tomohiro Nakai, et al., "Additional learning type object recognition system using co-occurrence features and k-neighborhood method", Information Processing Society of Japan, Symposium, Image Recognition and Understanding Symposium (MIRU2011), Jul. 20, 2011, pp. 1701-1702.

(Continued)

*Primary Examiner* — Ming Y Hon
(74) *Attorney, Agent, or Firm* — Sughrue Mion, PLLC

(57) ABSTRACT
A trained model creation method includes creating a trained model (50) based on training data (86) including first teacher image data (86*b*), determining whether or not an estimated region is erroneously estimated in inference result data (84), determining a noise region (60) included in the first teacher image data (86*b*), updating the first teacher image data (86*b*), and re-creating trained model (55).

12 Claims, 8 Drawing Sheets

(56)      References Cited

U.S. PATENT DOCUMENTS

| | | | |
|---|---|---|---|
| 2023/0029188 A1* | 1/2023 | Langoju | G06T 7/0012 |
| 2023/0052101 A1* | 2/2023 | Piao | G06T 7/194 |
| 2023/0131916 A1* | 4/2023 | Elbaz | G06F 16/54 |
| | | | 715/809 |
| 2023/0177686 A1* | 6/2023 | Ng | G06T 7/0012 |
| | | | 382/128 |
| 2023/0410273 A1* | 12/2023 | Guyduy | G06V 10/25 |
| 2024/0257352 A1* | 8/2024 | Hu | G06N 3/0475 |
| 2025/0245964 A1* | 7/2025 | Kuen | G06T 7/10 |

OTHER PUBLICATIONS

International Search Report for PCT/JP2022/003699 dated Apr. 26, 2022 [PCT/ISA/210].
Written Opinion for PCT/JP2022/003699 dated Apr. 26, 2022 [PCT/ISA/237].
Notice of Reasons for Refusal issued Aug. 20, 2024 in Japanese Application No. 2023-520772.
Office Action issued Feb. 4, 2025 in Japanese Application No. 2023-520772.
Chinese Office Action dated Mar. 30, 2026, issued in Chinese application No. 202180035451.7.

\* cited by examiner (A) SECOND TEACHER IMAGE DATA (B) INFERENCE RESULT DATA

61 { NORMAL CELL    87b
      ABNORMAL CELL
62 — BACKGROUND

61 { NORMAL CELL 84
      ABNORMAL CELL
62 — BACKGROUND

66 — FIRST REGION    83
67 — SECOND REGION
68 — THIRD REGION
69 — FOURTH REGION (C) SUBTRACTION IMAGE DATA (A) CELL IMAGE (B) PROCESSED IMAGE USING TRAINED MODEL BEFORE RE-CREATION 64a
64b     64b     82

81

■ NORMAL CELL
▨ ABNORMAL CELL
□ BACKGROUND 64a
64b     64b     81

61 { ■ NORMAL CELL
     ▨ ABNORMAL CELL
63 — ▥ NOISE
62 — □ BACKGROUND (C) PROCESSED IMAGE USING TRAINED MODEL AFTER RE-CREATION

PROCESSED IMAGE USING TRAINED
MODEL AFTER RE-CREATION

TRAINED MODEL CREATION METHOD USING MACHINE LEARNING USED TO PERFORM A SEGMENTATION PROCESS ON A CELL IMAGE AND TRAINED MODEL CREATION SYSTEM USING MACHINE LEARNING USED TO PERFORM A SEGMENTATION PROCESS ON A CELL IMAGE

This application is a National Stage of International Application No. PCT/JP2022/003699, filed on Jan. 31, 2022, which claims priority from Japanese Patent Application No. 2021-080479, filed on May 11, 2021.

TECHNICAL FIELD

The present invention relates to a trained model creation method and a trained model creation system.

BACKGROUND ART

Conventionally, a trained model creation method using machine learning used to perform a segmentation process on a cell image is known. Such a trained model creation method is disclosed in Re-publication of PCT International Publication No. WO2019/171453, for example.

Re-publication of PCT International Publication No. WO2019/171453 discloses that segmentation is performed on an observation image of pluripotent stem cells such as iPS cells or ES cells in order to identify regions such as undifferentiated cells and undifferentiated deviant cells that deviate from the undifferentiated state in the observation image. The segmentation on the observation image is performed using a trained model created by machine learning. The segmentation is performed on the input image (observation image) to be processed such that a label image is output in which an undifferentiated cell region (normal cell region), an undifferentiated deviant cell region (abnormal cell region), a background region in which no cells are present, etc. are labeled. Re-publication of PCT International Publication No. WO2019/171453 also discloses a training model creation method for creating a training model used when the segmentation is performed on the observation image.

PRIOR ART

Patent Document

Patent Document 1: Re-publication of PCT International Publication No. WO2019/171453

SUMMARY OF THE INVENTION

Problems to be Solved by the Invention

However, as a result of performing the segmentation on the input image, a portion of the label image to be labeled as a "background" region may be erroneously labeled as an "abnormal cell" region. On the other hand, in machine learning, the portion that may be erroneously labeled as an "abnormal cell" region as described above is learned as a "background" region such that a region of the label image to be labeled as an "abnormal cell" region may not be correctly labeled as an "abnormal cell" region. In other words, there is a problem that a detection target is not detected correctly. In particular, when "abnormal cells" appear less frequently than "normal cells", a decrease in the detection accuracy of "abnormal cells" becomes a major problem in practice.

The present invention is intended to solve at least one of the above problems. The present invention aims to provide a trained model creation method and a trained model creation system each capable of reducing or preventing a decrease in the detection accuracy of a detection target.

Means for Solving the Problems

A trained model creation method according to a first aspect of the present invention uses machine learning used to perform a segmentation process on a cell image, and includes creating a trained model based on training data including first input image data and first teacher image data that corresponds to the first input image data and is labeled with at least a first label indicating a detection target and a second label indicating a background, executing an inference process using a created trained model using inference process data including second input image data, determining whether or not a region estimated to be the detection target or the background in inference result data output by the inference process is erroneously estimated, specifying a noise region not falling under the first label or the second label from among estimated regions determined to be erroneously estimated, determining the noise region included in the first teacher image data, further labeling a region determined as the noise region in the first teacher image data with a third label indicating the noise region and updating the first teacher image data, and re-creating the trained model based on updated training data including updated first teacher image data and the first input image data.

A trained model creation system according to a second aspect of the present invention uses machine learning used to perform a segmentation process on a cell image, and includes a storage to store training data including first input image data and first teacher image data that corresponds to the first input image data and is labeled with at least a first label indicating a detection target and a second label indicating a background, and inference process data including at least second input image data, a trained model creator to create a trained model based on the training data acquired by the storage, and an inference process executor to execute an inference process using a created trained model using the inference process data stored in the storage. The storage is operable to further store updated training data including updated first teacher image data in which a noise region included in the first teacher image data and corresponding to a noise region not falling under the first label or the second label among regions erroneously estimated to be detection targets in result data output by the inference process executor has been further labeled with a third label indicating the noise region, and the first input image data, and the trained model creator is operable to re-create the trained model based on the updated training data stored in the storage.

Effect of the Invention

As described above, the trained model creation method according to the first aspect of the present invention includes determining whether or not the region estimated to be the detection target or the background in the inference result data is erroneously estimated, specifying the noise region from among the estimated regions determined to be erroneously estimated, determining the noise region included in the first teacher image data, further labeling the region determined as the noise region in the first teacher image data with the third label indicating the noise region and updating the first teacher image data, and re-creating the trained model based on the updated training data. Conceivably, a background region that may be erroneously labeled as a detection target in an input image is grasped in advance, and the types of labels in segmentation are set in advance to three types: a detection target region, a background region, and a noise region. However, it is often possible to recognize which region is the noise region for the first time by checking a label image in the result of segmentation of the input image performed using the trained model created by machine learning. That is, it is difficult to recognize in advance which region may become the noise region. Therefore, it is difficult to create the trained model in advance based on the training data including the teacher image data in which the three types of regions including a detection target region, a background region, and a noise region have been simply labeled. Therefore, the noise region included in the first teacher image data can be specified by specifying the noise region from among the regions determined to be erroneously estimated in the inference result data, and thus it is possible to relearn to detect the noise region while distinguishing it from regions with different labels. Therefore, the trained model can be re-created based on the updated training data, and thus a decrease in the detection accuracy of the detection target can be reduced or prevented.

As described above, the trained model creation system according to the second aspect of the present invention further stores the updated training data including the updated first teacher image data in which the noise region included in the first teacher image data and corresponding to the noise region among the regions erroneously estimated to be the detection targets in the inference result data output by the inference process executor has been further labeled with the third label indicating the noise region, and re-creates the trained model based on the updated training data. Accordingly, it is possible to relearn to detect the noise region included in the first teacher image data while distinguishing it from regions with different labels, similarly to the first aspect. Therefore, the trained model can be re-created based on the updated training data, and thus a decrease in the detection accuracy of the detection target can be reduced or prevented.

4

Figure 8:
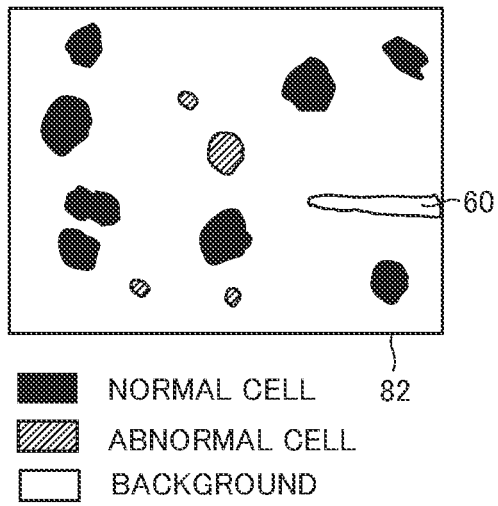

FIG. 8 is a schematic view showing an example of a processed image output using a re-created trained model according to a modified example.

MODES FOR CARRYING OUT THE INVENTION

Embodiments embodying the present invention are hereinafter described on the basis of the drawings.

First Embodiment

The configuration of an image analysis system 200 including a trained model creation system 100 according to a first embodiment and a trained model creation method are now described with reference to FIGS. 1 to 6.
Image Analysis System
The image analysis system 200 shown in FIG. 1 includes the trained model creation system 100 to create a trained model 55 using machine learning to be used to perform a segmentation process on a cell image 81. The trained model creation system 100 includes a controller 11 and a storage 12 in a server 10.

Figure 1:
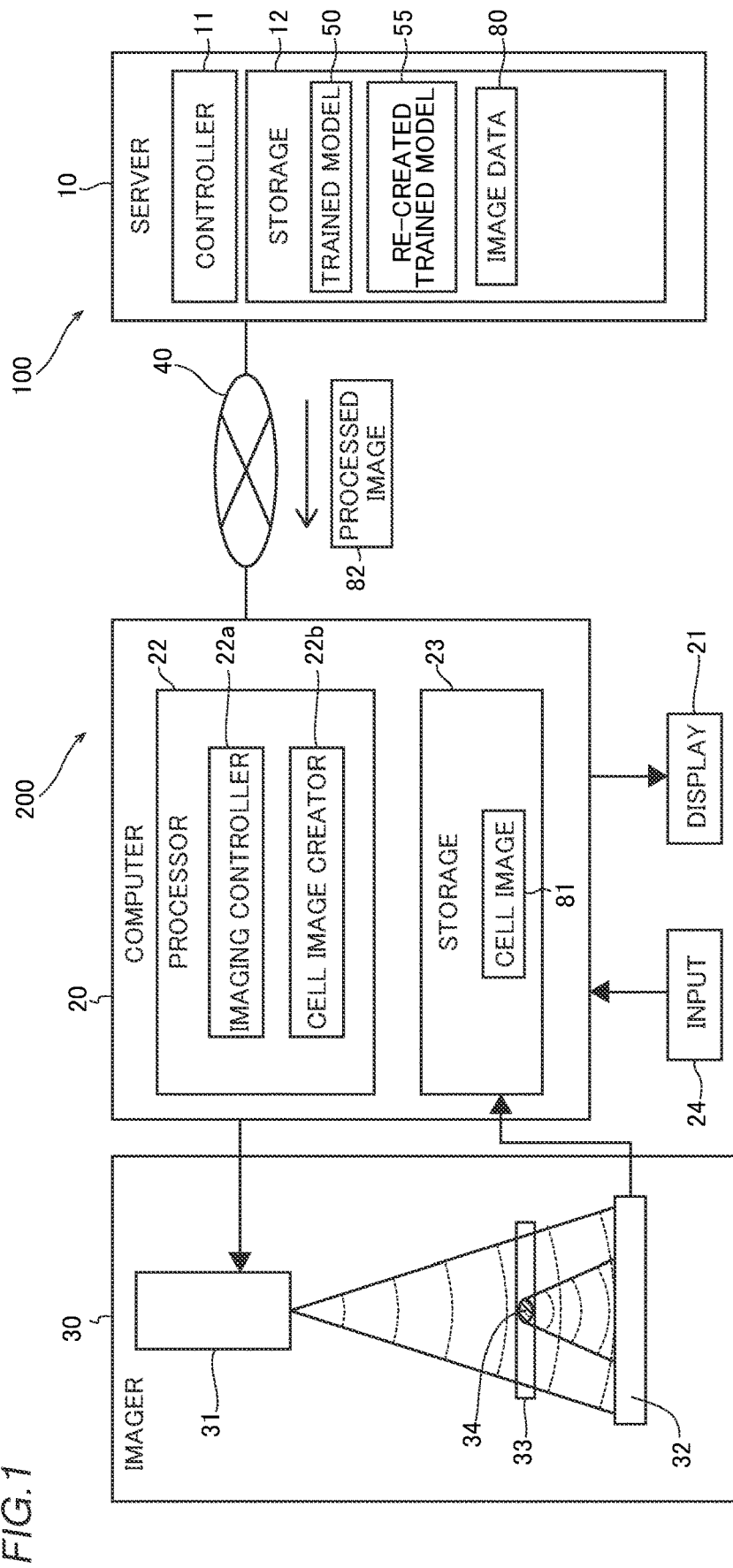
FIG. 1 is a block diagram for illustrating the outline of an image analysis system according to a first embodiment.

The image analysis system 200 includes the server 10, a computer 20, and an imager 30. FIG. 1 shows an example of the image analysis system 200 constructed using a client-server model. The server 10, the computer 20, and the imager 30 are communicably connected to each other via a network 40.

The computer 20 is a client terminal operated by a user, and transmits various process requests to the server 10. The computer 20 includes a display 21. The computer can acquire the cell image 81 captured by the imager 30 from the imager 30 and display the acquired cell image 81 on the display 21. The display 21 is a liquid crystal display device, for example.

The server 10 performs various information processes in response to the requests (process requests) from the computer 20. The server 10 includes the controller 11 and the storage 12.

The server 10 (controller 11) creates a trained model 50. Furthermore, the server 10 (controller 11) executes an inference process. The inference process is a process to output an inference result based on an input using the trained model 50 generated by machine learning. Moreover, the server 10 (controller 11) performs an image process on the cell image 81 using the trained model 50. As a result of the image process, the server 10 (controller 11) generates a processed image 82 of the cell image 81. The server 10 (controller 11) transmits the generated processed image 82 to the computer 20. The computer 20 that has received information causes the display 21 to display the processed image 82.

Figure 2:
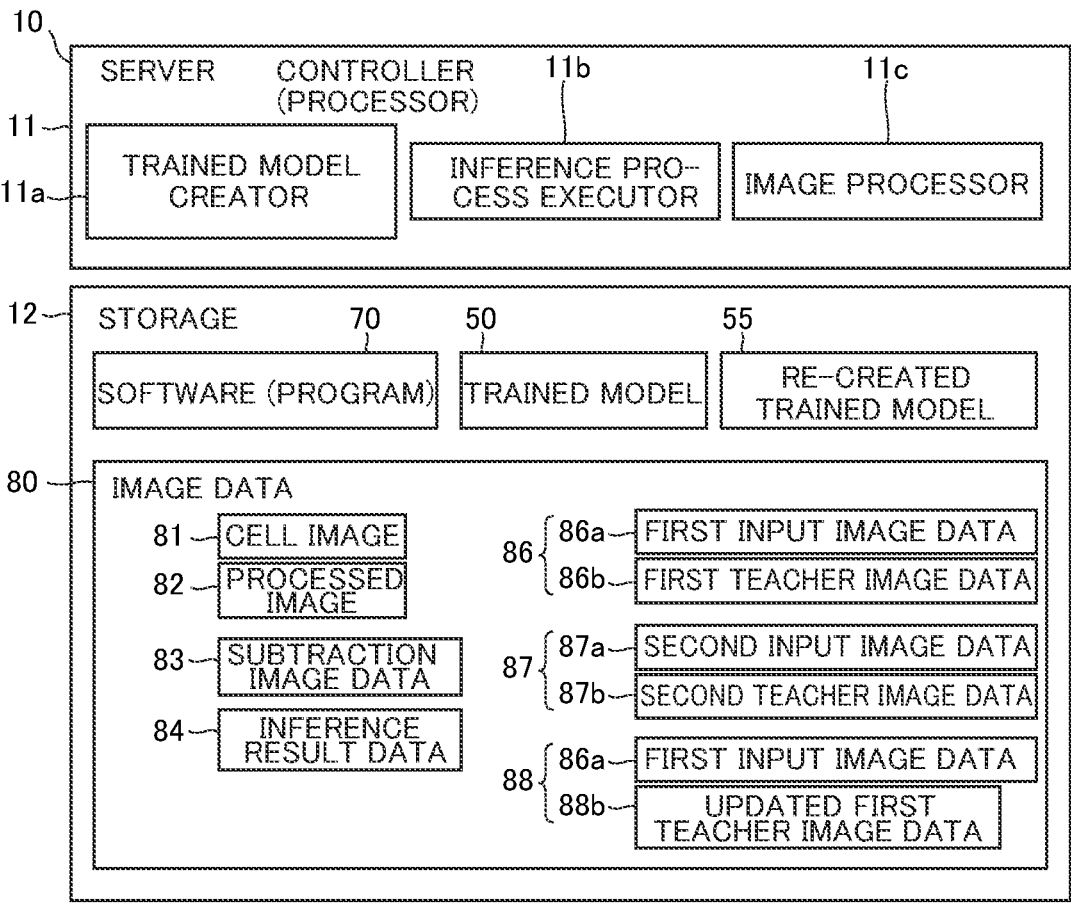
FIG. 2 is a block diagram for illustrating the configuration of a server.

The controller 11 creates the trained model 50 based on training data 86 (see FIG. 2). Furthermore, the controller 11 executes the inference process using the created trained model 50 using inference process data 87 (see FIG. 2). In this embodiment, the training data 86 is corrected and updated as training data 88 based on the result of the inference process on the inference process data 87 (see FIG. 2). Furthermore, the controller 11 re-creates the trained model 55 (see FIG. 3) based on the updated training data 88 (see FIG. 2). The re-created trained model 55 (see FIG. 3) is used to perform the segmentation process on the cell image 81.

The controller 11 creates subtraction image data 83 (see FIG. 2) indicating a difference between the inference process data 87 (see FIG. 2) and inference result data 84 (see FIG.

2). The controller 11 includes a processor such as a central processing unit (CPU), a Field-Programmable Gate Array (FPGA), or an application specific integrated circuit (ASIC). The processor executes a predetermined program to perform an arithmetic process as the controller 11.

The storage 12 is a device that stores information. The storage 12 stores the trained model 50, the re-created trained model 55 (see FIG. 2), and various image data 80. The storage 12 includes a nonvolatile storage device. The nonvolatile storage device is a hard disk drive or a solid state drive, for example.

The imager 30 generates the cell image 81 by imaging cells. The imager 30 can transmit the generated cell image 81 to the computer 20 and/or the server 10 via the network 40. The cell image 81 is an image of cultured cells cultured using a cell culture device, for example. The captured cell image 81 is a microscopic image. The imager performs imaging using an imaging method such as a bright field observation method, a dark field observation method, a phase difference observation method, or a differential interference observation method.

The network 40 connects the server 10, the computer 20, and the imager 30 to each other such that the server 10, the computer 20, and the imager 30 can communicate with each other. The network 40 may be a local area network (LAN) constructed within a facility, for example. The network 40 may be the Internet, for example. When the network is the Internet, the image analysis system 200 may be a system constructed in the form of cloud computing.

Specific Device Configuration of Image Analysis System

An example of a specific device configuration of the image analysis system 200 is now described.

The imager 30 is an in-line holographic microscope. The imager 30 includes a light source 31 including a laser diode, for example, and an image sensor 32. During imaging, a culture plate 33 containing cell colonies (or single cells) is placed between the light source 31 and the image sensor 32. The imager 30 generates an in-line holographic microscopy (IHM) phase image that is the cell image 81.

The computer 20 includes a processor 22, a storage 23, the display 21, and an input 24 that is a user interface. The input 24 includes input devices such as a mouse and a keyboard.

The processor 22 controls the operation of the imager and processes data acquired by the imager 30 by executing a program stored in the storage 23. The processor 22 includes an imaging controller 22a and a cell image creator 22b as functional blocks.

When the culture plate 33 containing cell colonies is set at a predetermined position on the imager 30 by the user and the processor 22 receives a predetermined operation via the input 24, the processor 22 controls the imager 30 using the imaging controller 22a to acquire hologram data.

The imager 30 causes the light source 31 to emit coherent light under the control of the imaging controller 22a. The imager 30 uses the image sensor 32 to acquire an image of interference fringes of light transmitted through the culture plate 33 and a cell colony 34 and light transmitted through a region in the vicinity of the cell colony 34 on the culture plate 33. The image sensor 32 acquires hologram data (two-dimensional light intensity distribution data of a hologram formed on a detection surface).

The cell image creator 22b calculates phase information by executing an arithmetic process for phase restoration on the hologram data acquired by the imager 30. Then, the cell image creator 22b creates an IHM phase image (cell image 81) based on the calculated phase information. Known techniques can be used to calculate the phase information and create the IHM phase image, and thus detailed description thereof is omitted.

The created cell image 81 is stored in the storage 23. Furthermore, the created cell image 81 is transmitted to the server 10 by the processor 22.

Server

As shown in FIG. 2, the controller 11 of the server includes a trained model creator 11a, an inference process executor 12b, and an image processor 11c as functional blocks.

The storage 12 stores the created trained model 50. The storage 12 stores the re-created trained model 55. The storage 12 stores a plurality of cell images 81 captured by the imager 30. For example, all the cell images 81 captured by the imager 30 are automatically transmitted to the server 10 and stored in the storage 12. The storage 12 also stores the training data 86 in which first input image data 86a is associated with first teacher image data 86b corresponding to the first input image data 86a. The training data 86 is used to create the trained model 50. The first teacher image data 86b is a ground truth image to be output as a result of the segmentation process on the first input image data 86a. The storage 12 also stores the inference process data 87 in which second input image data 87a is associated with second teacher image data 87b corresponding to the second input image data 87a. The inference process data 87 is used for the inference process. The second teacher image data 87b is a ground truth image to be output as a result of the inference process on the second input image data 87a. The storage 12 also stores the updated training data 88 including the first input image data 86a and updated first teacher image data 88b. The storage 12 also stores the subtraction image data 83 indicating a difference between the second teacher image data 87b of the inference process data 87 and the inference result data 84 corresponding to the second teacher image data 87b.

Trained Model Creator

The trained model creator 11a creates the trained model 50 by performing machine learning using the training data 86 stored in the storage 12. The trained model creator 11a creates the trained model 50 based on the training data 86 including the first input image data 86a and the first teacher image data 86b. Furthermore, the trained model creator 11a re-creates the trained model 55 based on the updated training data 88 including the first input image data 86a and the updated first teacher image data 88b.

Inference Process Executor

The inference process executor 11b executes the inference process using the inference process data 87 stored in the storage 12. The inference process executor 11b executes a segmentation inference process using the trained model 50 using the second input image data 87a included in the inference process data 87, and outputs the inference result data 84.

Image Processor

The image processor 11c performs the image process on the cell image 81 using the re-created trained model 55 stored in the storage 12. The image processor 11c performs the segmentation process on an input image by inputting, as the input image, the cell image 81 selected as a processing target into the re-created trained model 55. As a result of the segmentation process, the image processor 11c outputs, as the processed image 82, a label image in which the cell image 81 input into the retrained trained model 55 is divided into a plurality of label regions. The image processor 11*c* transmits the processed image 82 to the computer 20 and stores it in the storage 12.

In this description, the "segmentation process" refers to a process to divide an input image into a plurality of regions, and a process to segment an input image into a plurality of label regions by assigning a label indicating a detection target to a region in which the detection target appears. The label is information representing the meaning indicated by an image portion. Each of the label regions refers to a region (a portion of an image) including a group of pixels with a common label in an image.

Figure 3:
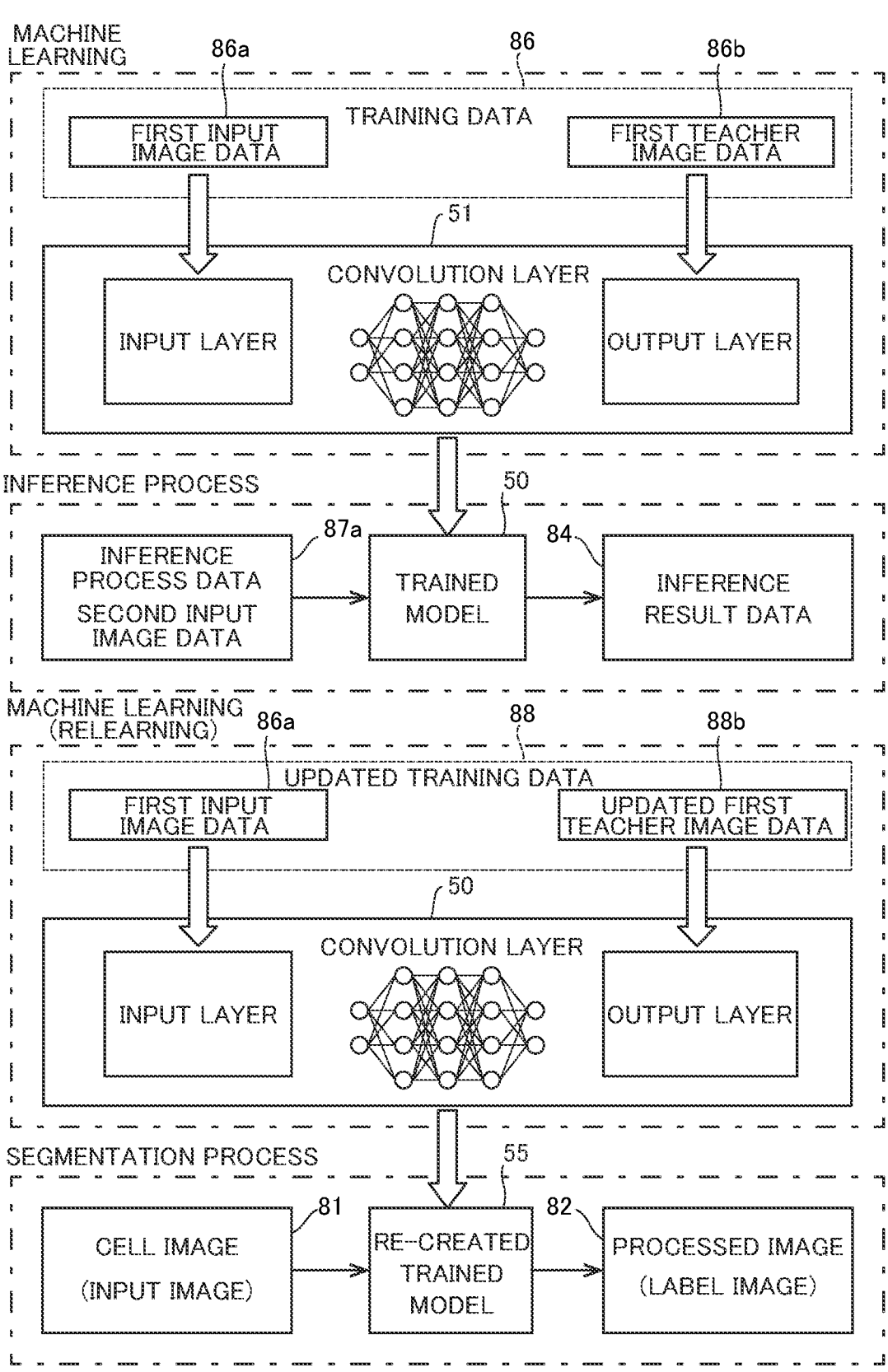
FIG. 3 is a diagram showing the outline of machine learning, an inference process, machine learning (relearning), and a segmentation process.

As shown in FIG. 3, the re-created trained model 55 performs the segmentation process on the input cell image 81 and outputs the processed image 82 divided into a plurality of label regions. Segmentation is performed by labeling each pixel in an image. A label may be assigned in units of a group (pixel group) of a plurality of pixels. The type of label is called a class.

The image processor 11*c* shown in FIG. 2 labels a region determined to be a noise region 60 (see FIG. 4) in the first teacher image data 86*b* with a third label 63 (see FIG. 5) indicating the noise region 60 (see FIG. 4) based on a user's operation on the input 24 (see FIG. 1) of the computer 20 to obtain the updated first teacher image data 88*b*. The noise region 60 (see FIG. 4) is described below.

The image processor 11*c* performs labeling with the third label (see FIG. 5) indicating the noise region 60 (see FIG. 4), and further creates the first teacher image data 88*b* labeled with the third label 63 (see FIG. 5) based on a user's operation on the input 24 (see FIG. 1) of the computer 20 when the number of updated first teacher image data 88*b* is less than a predetermined number. Specifically, the image processor 11*c* adds the first teacher image data 88*b* labeled with the third label 63 by extracting a portion or all of the region determined to be the noise region 60 (see FIG. 4) in the first teacher image data 86*b* from the first teacher image data 86*b* and embedding the extracted noise region 60 in the background of the cell image 81 stored in the storage 12 based on the user's operation on the input 24 (see FIG. 1) of the computer 20. The predetermined number is the number of updated first teacher image data 88*b* that is set in advance by the user and is considered to be statistically sufficient. Alternatively, the image processor 11*c* reuses the first teacher image data 88*b* stored in the storage 12 and labeled with the third label 63 in other training data based on a user's operation on the input 24 (see FIG. 1) of the computer 20, and adds the first teacher image data 88*b* labeled with the third label 63.

The image processor 11*c* creates the subtraction image data 83 indicating the difference between the second teacher image data 87*b* of the inference process data 87 and the inference result data 84 corresponding to the second teacher image data 87*b*.

Subtraction Image Data

Figure 4:
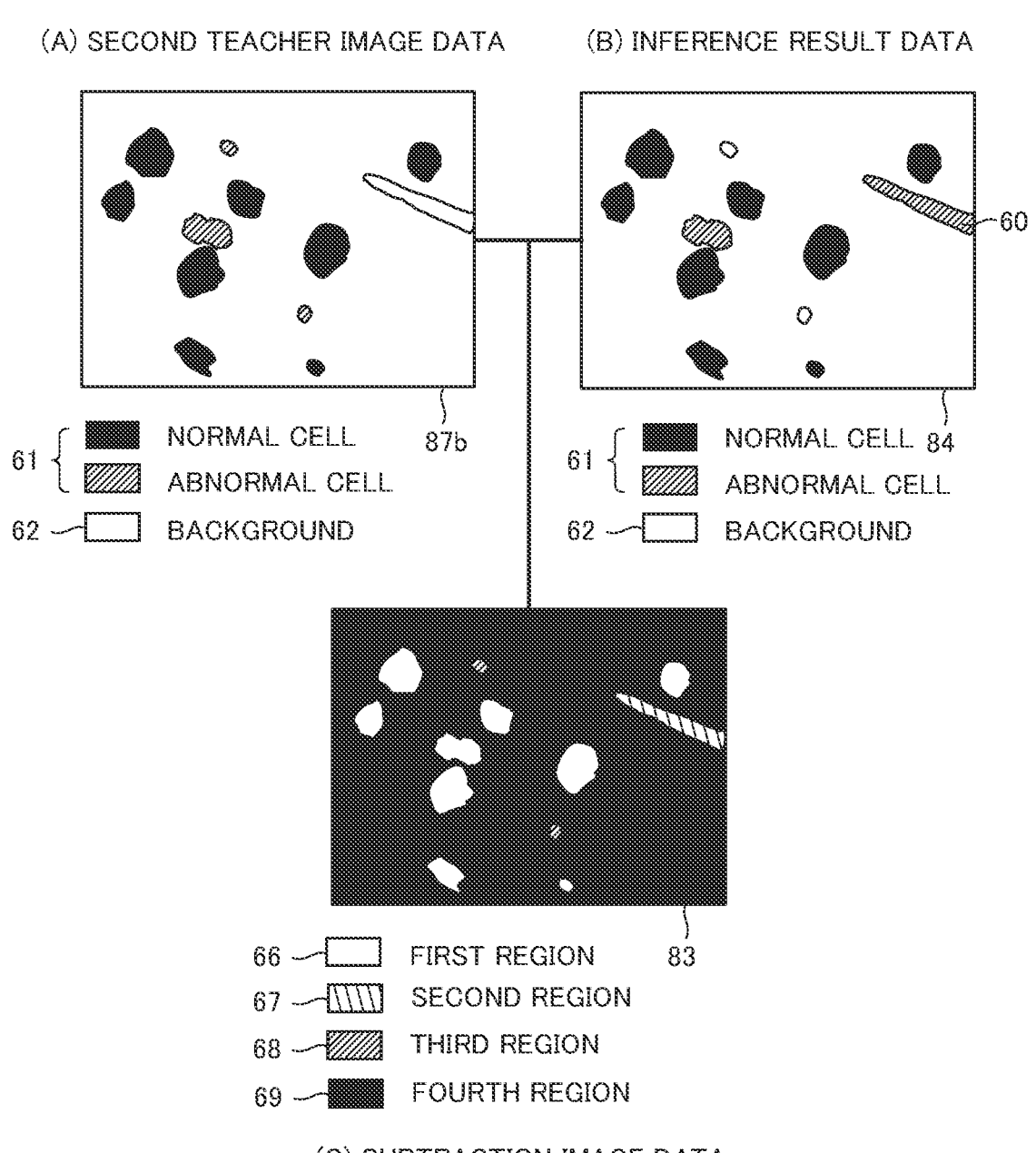
FIG. 4 is a schematic view for illustrating subtraction image data.

As shown in FIG. 4, the subtraction image data 83 is image data for extracting an erroneously estimated region in the inference result data 84. The subtraction image data 83 is image data showing points of agreement and differences between the second teacher image data 87*b* included in the inference process data 87 (see FIG. 2) and the inference result data 84 corresponding to the second teacher image data 87*b*. The second teacher image data 87*b* is labeled with a first label 61 indicating a detection target and a second label 62 indicating a background. The inference result data

84 is also labeled with the first label 61 indicating a detection target and the second label 62 indicating a background based on the inference.

FIG. 4 shows an example in which in the second teacher image data 87*b* and the inference result data 84, an image (cell image) of pluripotent stem cells such as iPS cells or ES cells is divided into three-class regions including a "normal cell" region (undifferentiated cell region, which is a cell that maintains pluripotency) to be detected, an "abnormal cell" region (undifferentiated deviant cell region, which is a cell that has deviated from an undifferentiated state) to be detected, and a "background" region other than those. In the segmentation process, the number of classes and the contents of the labels to be detected may vary depending on the intended use of the created trained model. Therefore, in the present invention, the number of classes and the contents of the labels to be detected are not particularly limited.

In the subtraction image data 83, first regions 66 labeled with the first label 61 in both the second teacher image data 87*b* and the inference result data 84 among corresponding regions of the second teacher image data 87*b* and the inference result data 84 identifiably appear. A second region 67 labeled with the second label 62 in the second teacher image data 87*b* and labeled with the first label 61 in the inference result data 84 among the corresponding regions of the second teacher image data 87*b* and the inference result data 84 identifiably appears. Third regions 68 labeled with the first label 61 in the second teacher image data 87*b* and labeled with the second label 62 in the inference result data 84 among the corresponding regions of the second teacher image data 87*b* and the inference result data 84 identifiably appear. A fourth region 69 labeled with the second label 62 in both the second teacher image data 87*b* and the inference result data 84 among the corresponding regions of the second teacher image data 87*b* and the inference result data 84 identifiably appears.

Noise Region

For example, scratches on a culture surface that appear in input image data are not detected. Therefore, regions such as scratches on the culture surface in teacher image data are labeled as background regions. In other words, the regions such as scratches on the culture surface do not appear in the teacher image data. However, when machine learning is performed using such input image data and teacher image data, a training model learns on the assumption that backgrounds are non-uniform. When the segmentation process is performed using the created trained model, a cell in a cell image that closely resembles a scratch in shape can be labeled as a background region. When machine learning is performed using input image data with no scratches on the culture surface and teacher image data, a training model learns on the assumption that backgrounds are uniform. When the segmentation process is performed using the created trained model, a cell in a cell image that closely resembles a scratch on the culture surface in shape can be labeled as a detection target region. A background region that may be erroneously labeled as a detection target in such a processed image can often be recognized for the first time by checking a label image in the segmentation result, and it is difficult to recognize the background region in advance. Furthermore, it is similarly difficult to recognize in advance a detection target region that may be erroneously labeled as a background region in the processed image. In this embodiment, a background region that may be erroneously labeled as a detection target in such a processed image, and a detection target region that may be erroneously labeled as a background region in the processed image are called noise regions 60. The noise region 60 shown in FIG. 4 is a background region that may be erroneously labeled as a detection target in the processed image, and is a foreign object.

The noise region 60 refers to a region determined to be erroneously estimated by the image processor 11*c* (see FIG. 2) and not falling under the first label 61 or the second label 62 among regions estimated to be detection targets in the inference result data 84 output by the inference process. In this embodiment, the noise region 60 refers to a "normal cell" region or an "abnormal cell" region determined to be erroneously estimated in the inference result data 84 and not falling under the first label 61 or the second label 62. The noise region 60 also refers to a region specified by the user as having a large influence (non-ignorable) on the detection accuracy of the detection target. For example, the noise region 60 refers to a region specified as having a large influence on the detection accuracy of the detection target such as a region in which an object included in a "background" region and not falling under a "normal cell" or an "abnormal cell" is erroneously estimated to be an "abnormal cell".

Update of First Input Image Data

Therefore, in this embodiment, the trained model 50 is created by performing machine learning using the training data 86 including the first input image data 86*a* and the first teacher image data 86*b*. The first input image data 86*a* may include the noise region 60. Next, using the second input image data 87*a* included in the inference process data 87, the inference process is executed by the created trained model 50, and the inference result data 84 is output. The second input image data 87*a* may also include the noise region 60. The subtraction image data 83 indicating the difference between the inference result data 84 and the second teacher image data 87*b* included in the inference process data 87 is created. As shown in FIG. 4, the user compares the subtraction image data 83 with the inference result data 84. At this time, when the noise region 60 is included in the second input image data 87*a*, the second region 67 appears in the subtraction image data. Therefore, the user can specify the noise region 60 included in the inference result data 84. The user determines the noise region 60 that may be included in the first input image data 86*a*. In the first input image data 86*a*, the user can determine a region similar in shape to the noise region 60 specified in the inference result data 84 as the noise region 60, for example. The user can use the input 24 to assign the third label 63 to the noise region 60 determined in the first input image data 86*a*. The computer 20 or the image processor 11*c* updates the first input image data 86*a* to which the third label 63 has been assigned, and stores it in the storage 12 as updated first input image data 88*a*.

Outline of Machine Learning, Inference Process, Machine Learning (Relearning), and Segmentation Process An outline of machine learning, the inference process, machine learning (relearning), and the segmentation process according to this embodiment is now described with reference to FIG. 3.

Machine Learning

The trained model creator 11*a* (see FIG. 2) performs machine learning using the training data 86 stored in the storage 12. The trained model creator 11*a* acquires the training data 86 from the storage 12. The training data 86 includes a sufficient number of data. Individual training data 86 includes the first input image data 86*a* to be processed and the first teacher image data 86*b*. The trained model creator 11*a* causes the training model 51 to learn a conversion process (segmentation process) from the first input image data 86*a* to the first teacher image data 86*b* using the first input image data 86*a* as an input and the first teacher image data 86*b* as an output. The trained model 50 is generated by performing machine learning.

In this embodiment, the classes of the first teacher image data 86*b* include a "normal cell" region (undifferentiated cell region in a pluripotent stem cell such as an iPS cell or ES cell, for example) as a detection target, an "abnormal cell" region (undifferentiated deviant cell region that has deviated from an undifferentiated state in an iPS cell or ES cell, for example) as a detection target, and a "background" region.

As a machine learning method for the trained model 50, any method such as a fully convolutional network (FCN), a neural network, a support vector machine (SVM), or boosting can be used. As an example, a convolutional neural network frequently used for semantic segmentation is used for the trained model 50. Such a trained model 50 includes an input layer into which an image is input, a convolution layer, and an output layer.

Inference Process

The inference process executor 11*b* (see FIG. 2) executes the inference process using the created trained model 50 using the second input image data 87*a* included in the inference process data 87 stored in the storage 12. The inference process executor 11*b* acquires the second input image data 87*a* included in the inference process data 87 from the storage 12. The inference process data 87 includes a sufficient number of data. During the inference process, the segmentation process is performed on the second input image data 87*a* by inputting the second input image data 87*a* used for the inference process into the trained model 50 such that the inference result data 84 divided into a plurality of label regions can be output.

The inference process data 87 used for the inference process is different from the training data 86 used for machine learning. Similarly to the classes of the first teacher image data 86*b*, the classes of the second teacher image data 87*b* and the classes of the inference result data 84 include a "normal cell" region as a detection target, an "abnormal cell" region as a detection target, and a "background" region.

Machine Learning (Relearning)

The trained model creator 11*a* relearns the trained model 50 using the updated training data 88 stored in the storage 12. The trained model creator 11*a* acquires the updated training data 88 from the storage 12. The updated training data 88 includes the first input image data 86*a* to be processed and the updated first teacher image data 88*b*. The trained model creator 11*a* causes the trained model 50 to learn a conversion process (segmentation process) from the first input image data 86*a* to the updated first teacher image data 88*b* using the first input image data 86*a* as an input and the updated first teacher image data 88*b* as an output. The re-created trained model 55 is generated by performing machine learning (relearning).

In this embodiment, the classes of the updated first teacher image data 88*b* include a "normal cell" region as a detection target, an "abnormal cell" region as a detection target, a "background" region, and a "noise" region.

Segmentation Process

The re-created trained model 55 performs the segmentation process on the input cell image 81 and outputs the processed image 82 divided into a plurality of label regions.

Figure 5:
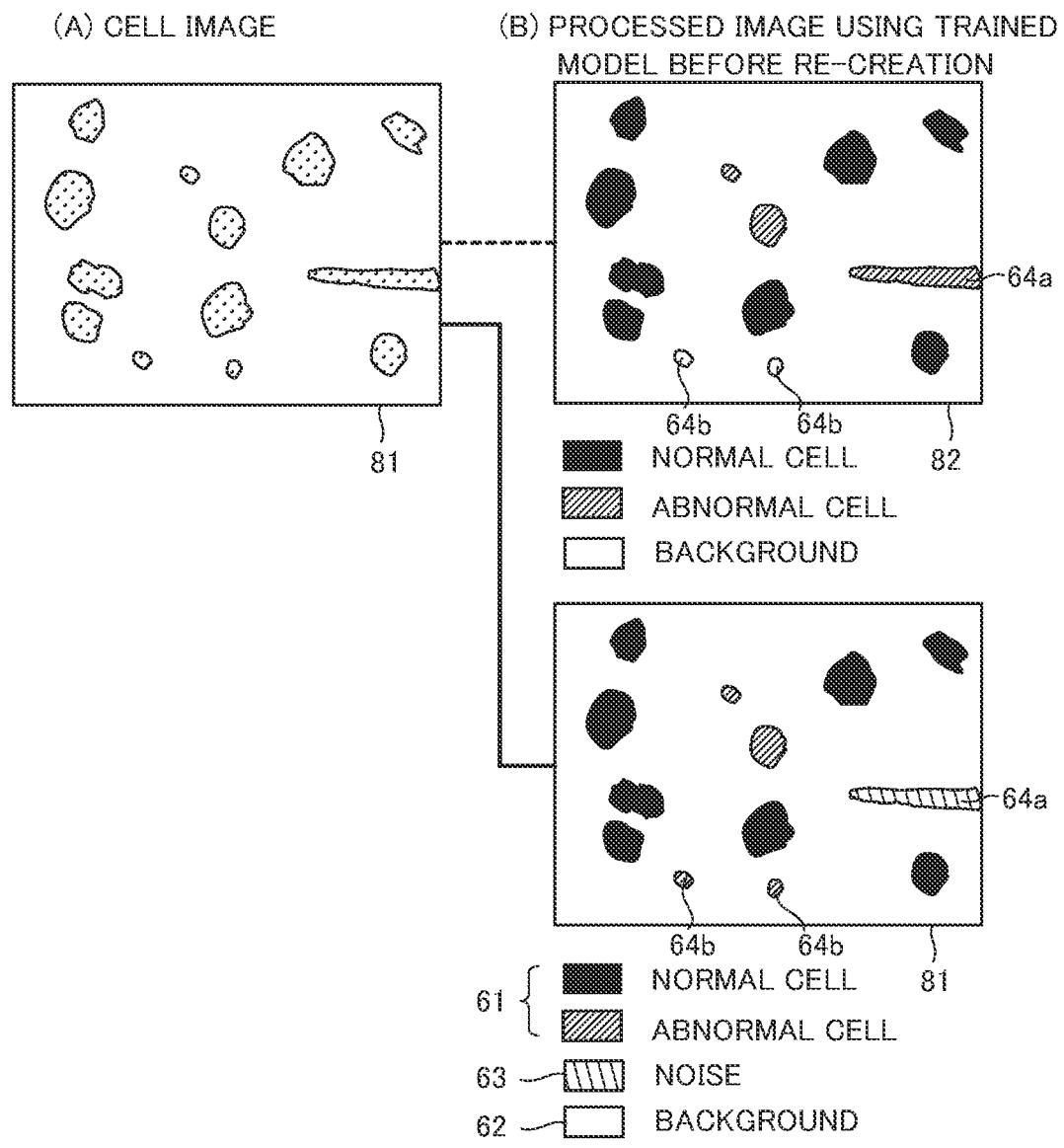
FIG. 5 is a schematic view showing a comparison between an example of a processed image output using a trained model before re-creation and an example of a processed image output using a re-created trained model.

In an example of the processed image 82 output using the trained model 50 before re-creation shown in FIG. 5, a region 64*a* is a portion of the "background", and regions 64*b* are "abnormal cell" regions to be detected. Also, in an example of the processed image 82 output using the re-created trained model 55, a region 64a is a portion of the "background", and regions 64b are "abnormal cell" regions to be detected. In the processed image 82 output using the pre-updated trained model 50, the region 64a is erroneously detected as an "abnormal cell" region, and the regions 64b are erroneously detected as "background" regions. On the other hand, in the processed image 82 output using the updated trained model 55, the region 64a is correctly detected as the noise region 60, and the regions 64b are correctly detected as "abnormal cell" regions.

Process for Machine Learning, Inference Process, and Machine Learning (Relearning)

Figure 6:
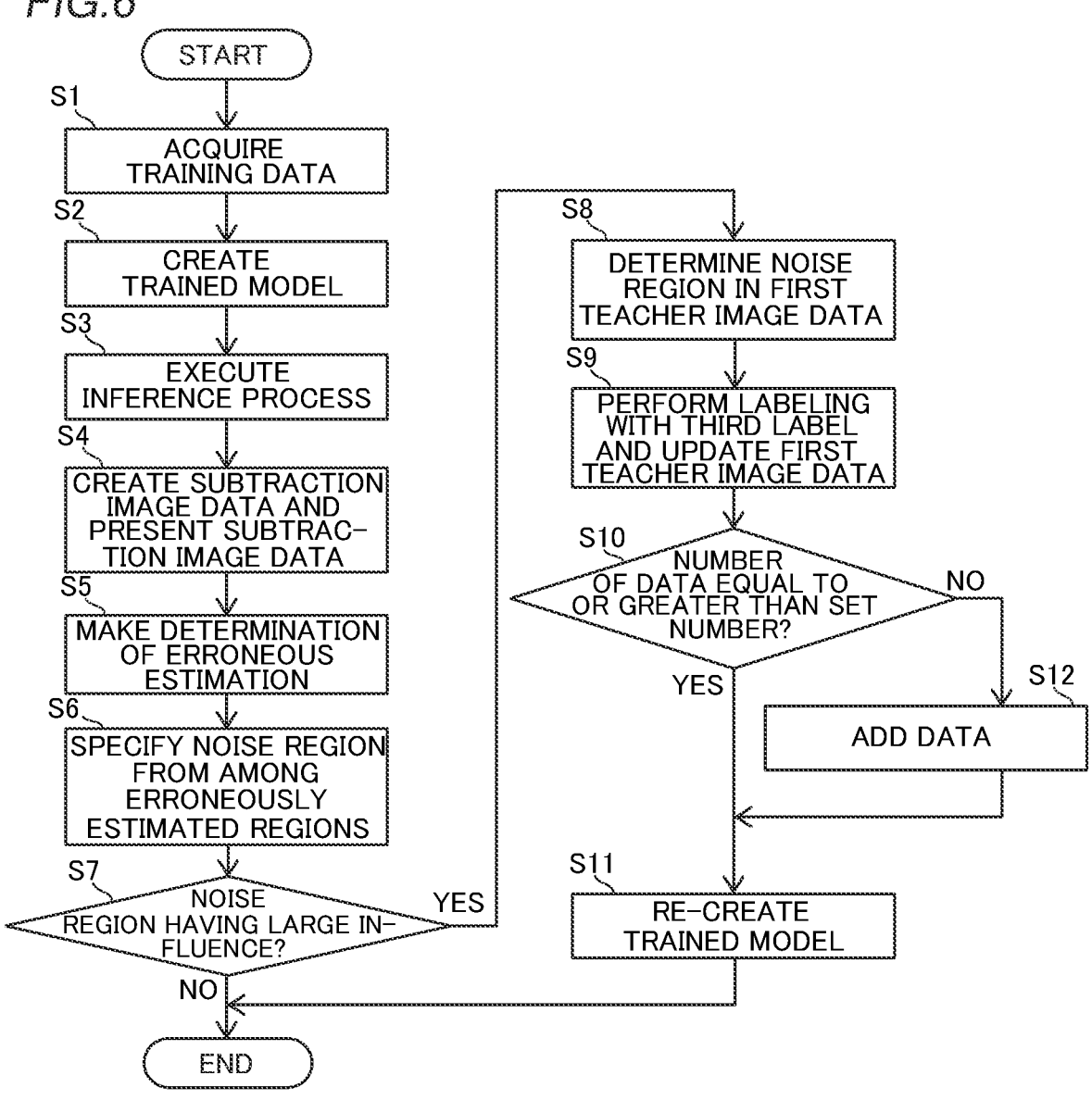
FIG. 6 is a flowchart for illustrating machine learning, an inference process, and machine learning (relearning) according to the first embodiment.

A process for machine learning, the inference process, and machine learning (relearning) according to this embodiment is now described with reference to FIG. 6.

In step S1, the trained model creator 11a acquires the training data 86 including the first input image data 86a and the first teacher image data 86b from the storage 12. Then, the process advances to step S2.

In step S2, the trained model creator 11a causes the trained model 50 to learn the conversion process (segmentation process) from the first input image data 86a to the first teacher image data 86b using the first input image data 86a as an input and the first teacher image data 86b as an output, and creates the trained model 50. Then, the process advances to step S3.

In step S3, the inference process executor 11b executes the inference process by inputting the second input image data 87a stored in the storage 12 into the created trained model 50, and outputs the inference result data 84. Then, the process advances to step S4.

In step S4, the image processor 11c creates the subtraction image data 83 indicating the difference between the second teacher image data 87b stored in the storage 12 and the inference result data 84. Furthermore, the server 10 (controller 11) transmits the created subtraction image data 83 and the inference result data 84 to the computer 20, and the computer 20 causes the display 21 to display the subtraction image data 83 and the inference result data 84. Then, the process advances to step S5.

In step S5, the controller 11 acquires, based on a user's operation on the input 24, a determination result as to whether or not the region estimated to be a detection target in the inference result data 84 output by the inference process is erroneously estimated based on the subtraction image data 83 and the inference result data 84 displayed on the display 21. Then, the process advances to step S6.

In step S6, the controller 11 acquires, based on a user's operation on the input 24, a result of specifying the noise region 60 not falling under the first label 61 or the second label 62 from among the regions estimated to be detection targets in the inference result data 84 and determined to be erroneously estimated. Then, the process advances to step S7.

In step S7, a determination result as to whether or not the noise region 60 has a large influence on the detection accuracy of the detection target is acquired based on a user's operation on the input 24. When it is determined that the noise region 60 has a large influence on the detection accuracy of the detection target (Yes in step S7), the process advances to step S8, and when it is determined that the noise region 60 does not have a large influence on the detection accuracy of the detection target (No in step S7), the process is terminated.

In step S8, based on a user's operation on the input 24, a determination result is acquired in which the noise region 60 included in the first teacher image data 86b is determined based on the noise region 60 specified in the inference result data 84. Then, the process advances to step S9.

In step S9, the user confirms the subtraction image data 83 or the training data 86 including the first teacher image data 86b, and labels the region determined to be the noise region 60 in the first teacher image data 86b with the third label 63 indicating the noise region 60. For example, labeling with the third label 63 can be performed via the input 24 of the computer. A method for labeling with the third label 63 is not particularly limited. Labeling with the third label 63 is performed, and the first teacher image data 86b is updated. Then, the process advances to step S10.

In step 10, based on a user's operation on the input 24, a determination result as to whether or not the number of updated first teacher image data 88b is equal to or greater than the number of updated first teacher image data 88b set in advance by the user is acquired. When it is determined that the number of updated first teacher image data 88b is equal to or greater than the number of updated first teacher image data 88b set in advance by the user (Yes in step S10), the process advances to step S11, and when it is determined that the number of updated first teacher image data 88b is less than the number of updated first teacher image data 88b set in advance by the user (No in step S10), the process advances to step S12.

In step S11, the trained model creator 11a re-creates (relearns) the trained model 55 based on the updated training data 88 including the updated first teacher image data 88b and the first input image data 86a. The updated trained model 55 is created by performing machine learning (relearning). Then, the process is terminated.

In step S12, the user further creates (adds) the first teacher image data 88b labeled with the third label 63. Then, the process advances to step S11.

Advantages of First Embodiment

In the first embodiment, the following advantages are obtained.

In the first embodiment, as described above, the trained model creation method includes a step of determining whether or not the region estimated to be a detection target in the inference result data 84 is erroneously estimated, a step of specifying the noise region 60 from among the estimated regions determined to be erroneously estimated and determining the noise region 60 included in the first teacher image data 86b, a step of further labeling the region determined as the noise region 60 in the first teacher image data 86b with the third label 63 indicating the noise region 60 and updating the first teacher image data 86b, and a step of re-creating the trained model 55 based on the updated training data 88. Conceivably, the background region that may be erroneously labeled as a detection target in the input image is grasped in advance, and the types of labels in segmentation are set in advance to three types: a detection target region, a background region, and a noise region. However, it is often possible to recognize which region is the noise region 60 for the first time by checking the label image in the result of segmentation of the input image performed using the trained model created by machine learning. That is, it is difficult to recognize in advance which region may become the noise region 60. Therefore, it is difficult to create the trained model in advance based on the training data including the teacher image data in which the three types of regions including a detection target region, a background region, and a noise region have been simply labeled. Therefore, the noise region 60 included in the first teacher image data 86*b* can be determined by specifying the noise region 60 from among the regions determined to be erroneously estimated in the inference result data 84, and thus it is possible to relearn to detect the noise region 60 while distinguishing it from regions with different labels. Therefore, the trained model 55 can be re-created based on the updated training data 88, and thus a decrease in the detection accuracy of the detection target can be reduced or prevented.

In the first embodiment, as described above, the trained model creation method further includes a step of creating, as image data for extracting the erroneously estimated region in the inference result data 84, the subtraction image data 83 indicating the difference between the second teacher image data 87*b* and the inference result data 84 corresponding to the second teacher image data 87*b*. Accordingly, the difference between the second teacher image data 87*b* to which a correct label has been assigned and the inference result data 84, which is indicated in the subtraction image data 83, can be easily recognized. Therefore, based on the subtraction image data 83, the erroneously estimated region in the inference result data 84 can be easily recognized. Consequently, the noise region 60 can be easily specified.

In the first embodiment, as described above, the subtraction image data in which the first region 66 labeled with the first label 61, the second region 67 labeled with the second label 62 in the second teacher image data 87*b* and labeled with the first label 61 in the inference result data 84, and the third region 68 labeled with the first label 61 in the second teacher image data 87*b* and labeled with the second label 62 in the inference result data 84 identifiably appear is created. Accordingly, in the subtraction image data 83, the first region 66 correctly estimated to be a detection target region, the second region 67 in which a background region is erroneously estimated to be a detection target region, and the third region 68 in which a detection target region is erroneously estimated to be a background region identifiably appear. Therefore, the noise region 60 can be more easily specified.

In the first embodiment, as described above, the noise region 60 is at least one but not all of the erroneously estimated regions. Accordingly, among the regions in which the background region is erroneously estimated to be a detection target region, the region having a large influence on the detection accuracy of the detection target can be specified as the noise regions 60. Therefore, it is not necessary to specify all the regions in which the background region is erroneously estimated to be a detection target region as the noise regions 60, and thus the noise region 60 can be efficiently specified.

In the first embodiment, as described above, in the step of re-creating the trained model 55, the trained model 55 is re-created based on the updated training data 88 to which, in addition to the updated training data 88, the training data 88 including the first input image data 86*a* and the first teacher image data 88*b* labeled with the third label 63 has been further added. Accordingly, even when the number of first teacher image data 86*b* labeled with the third label 63 in the updated training data 88 is small, the number of first teacher image data 88*b* labeled with the third label 63 can be secured.

In the first embodiment, as described above, the trained model creation system further acquires the updated training data 88 including the updated first teacher image data 88*b* in which the noise region 60 included in the first teacher image data 86*b* and corresponding to the noise region 60 among the regions erroneously estimated to be detection targets in the inference result data 84 output by the inference process executor 11*b* has been further labeled with the third label 63 indicating the noise region 60, and re-creates the trained model 55 based on the updated training data 88. Accordingly, it is possible to relearn to detect the noise region 60 included in the first teacher image data 88*b* while distinguishing it from regions with different labels. Therefore, the trained model 55 can be re-created based on the updated training data 88, and thus a decrease in the detection accuracy of the detection target can be reduced or prevented.

Second Embodiment

A trained model creation system and a trained model creation method according to a second embodiment of the present invention are now described. In the second embodiment, it is determined whether or not a region estimated to be a low-occurrence detection target having an occurrence frequency equal to or less than a predetermined threshold and included in a detection target in inference result data 84 is erroneously estimated, unlike the first embodiment in which it is determined whether or not the region estimated to be a detection target in the inference result data 84 output by the inference process is erroneously estimated.

The influence of a noise region 60 on the detection accuracy of a detection target becomes significant when the occurrence frequency of the detection target is low (in a case of the low-occurrence detection target). Suppose, for example, there are one thousand cell images 81 on which a segmentation process is to be performed, and among the thousand images, there are only five cell images in which the low-occurrence detection target appears. In this case, when there are five processed images 82 in which the noise region 60 is erroneously detected as a "low-occurrence detection target" region, the correct answer rate for region detection drops to 50%. In contrast, when the number of processed images in which the noise region 60 is erroneously detected as a "low-occurrence detection target" region can be reduced from five to one, the correct answer rate for region detection can be increased to 83.3%.

In this embodiment, the low-occurrence detection target includes an "abnormal cell". Furthermore, in this embodiment, the noise region 60 refers to a region in which an "abnormal cell" region is determined to be erroneously estimated in the inference result data 84 and that does not fall under a first label 61 or a second label 62.

A trained model creator 11*a* shown in FIG. 2 acquires the occurrence frequency of a detection target included in training data 86 including first input image data 86*a* and first teacher image data 86*b* and acquired from a storage 12. Furthermore, the trained model creator 11*a* determines whether or not the acquired occurrence frequency of the detection target is equal to or less than a preset threshold. A case in which the acquired occurrence frequency of the detection target is equal to or less than the preset threshold includes a case in which the number of first input image data 86*a* in which the detection target appears is three or less per ten first input image data, and a case in which the ratio of the area of a detection target region to the total area of all the first input image data 86*a* is 10% or less, for example. The preset threshold is not limited to these, but can be set as appropriate.

The trained model creator 11*a* determines that the low-occurrence detection target is present when the occurrence frequency of the detection target is equal to or less than the preset threshold, and stores, in the storage 12, the presence of the low-occurrence detection target. A server 10 (controller 11) transmits information that the training data 86 includes the low-occurrence detection target to a computer 20, and the computer 20 that has received the information notifies a user via a display 21 that the low-occurrence detection target is included.

An image processor 11c determines whether or not there are the first input image data 86a and the first teacher image data 86b that include the low-occurrence detection target in other training data 86 stored in the storage 12. When there are the first input image data 86a and the first teacher image data 86b that include the low-occurrence detection target, the image processor 11c adds these data to the training data 86. When there is no first input image data 86a or first teacher image data 86b that includes the low-occurrence detection target, or when a preset number of data is not reached even after the first input image data 86a and the first teacher image data 86b that include the low-occurrence detection target are added, the image processor 11c creates the first input image data 86a and the first teacher image data 86b that include the low-occurrence detection target. Specifically, based on a user's operation on an input 24 (see FIG. 1) of the computer 20, the low-occurrence detection target is extracted from the first input image data 86a or the first teacher image data 86b that includes the low-occurrence detection target, and the extracted low-occurrence detection target is embedded into the background of the training data 86 stored in the storage 12 such that the first input image data 86a and the first teacher image data 86b that include the low-occurrence detection target are added. A method for creating the first input image data 86a and the first teacher image data 86b that include the low-occurrence detection target is not particularly limited, and a known data extension method can be used.

Process for Machine Learning, Inference Process, and Machine Learning (Relearning)

Figure 7:
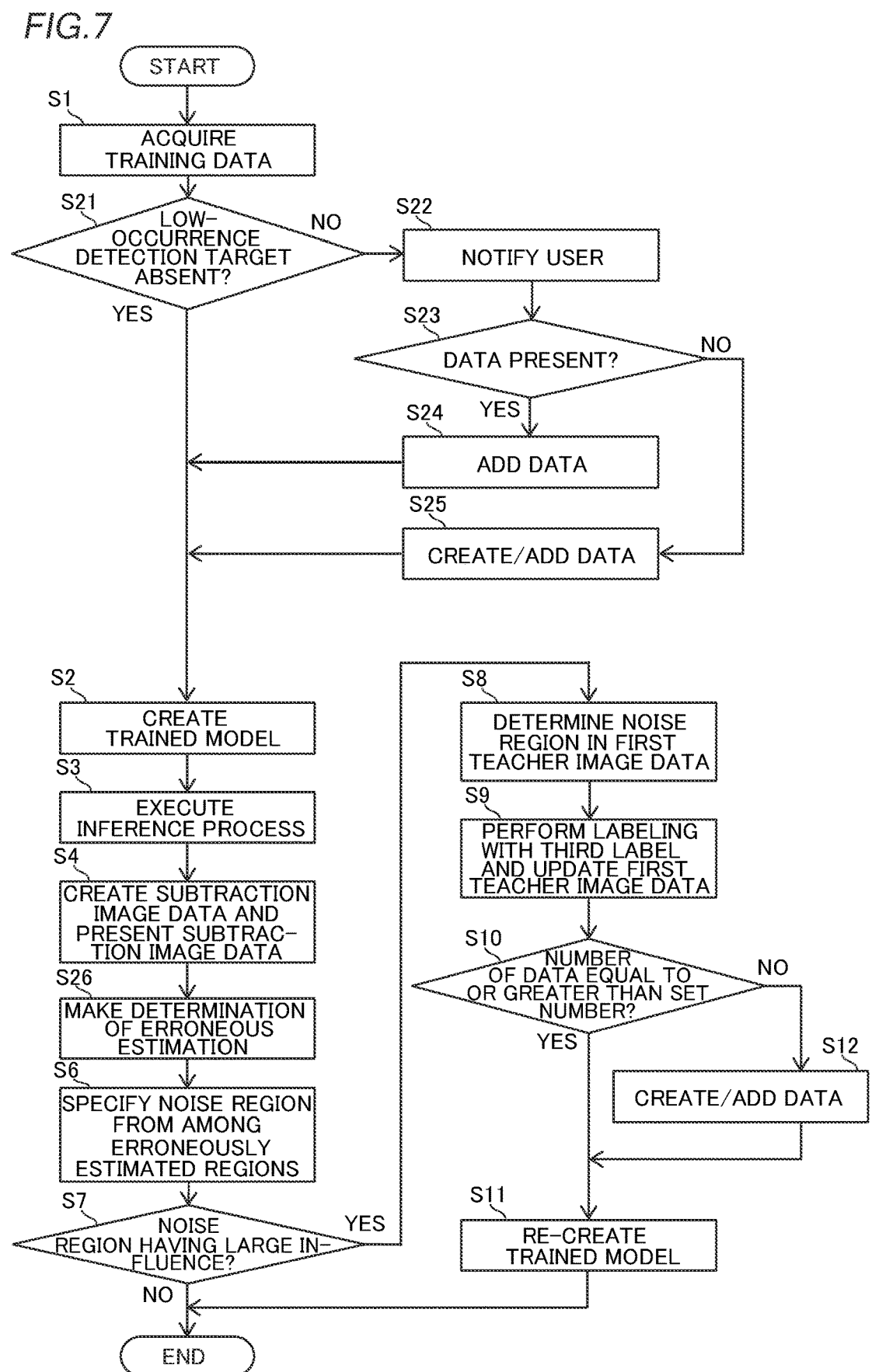
FIG. 7 is a flowchart for illustrating machine learning, an inference process, and machine learning (relearning) according to a second embodiment.

A process for machine learning, an inference process, and machine learning (relearning) according to this embodiment is now described with reference to FIG. 7. Process operations that are different from those in the first embodiment are described, and description of process operations that are similar to those in the first embodiment is omitted.

In step S21, the trained model creator 11a acquires the occurrence frequency of the detection target included in the training data 86 acquired from the storage 12 and including the first input image data 86a and the first teacher image data 86b, and determines whether the low-occurrence detection target is present or absent. When the low-occurrence detection target is absent (Yes in step S21), the process advances to step S2, and when the low-occurrence detection target is present (No in step S21), the process advances to step S22.

In step S22, the trained model creator 11a stores in the storage 12 that the low-occurrence detection target is present, and the server 10 (controller 11) notifies the user via computer 20 that the low-occurrence detection target is included. Then, the process advances to step S23.

In step S23, the image processor 11c determines whether or not there are the first input image data 86a and the first teacher image data 86b that include the low-occurrence detection target in other training data 86 stored in the storage 12. When there are the first input image data 86a and the first teacher image data 86b that include the low-occurrence detection target (Yes in step S23), the process advances to step S24, and when there is no the first input image data 86a or the first teacher image data 86b that include the low-occurrence detection target or when the preset number of data is not reached even when the training data 86 is added (No in step S23), the process advances to step S24.

In step S24, the image processor 11c adds the first input image data 86a and the first teacher image data 86b that include the low-occurrence detection target to the training data 86. Then, the process advances to step S2.

In step S25, based on a user's operation on the input 24, the first input image data 86a and the first teacher image data 86b that include the low-occurrence detection target are created (added). Then, the process advances to step S2.

In step S26, based on a user's operation on the input 24, a determination result as to whether or not the region estimated to be an "abnormal cell" region that is the low-occurrence detection target in the inference result data 84 output by the inference process is erroneously estimated based on subtraction image data 83 and the inference result data 84 displayed on the display 21 is acquired. Then, the process advances to step S6.

The remaining configurations of the second embodiment are similar to those of the first embodiment.

Advantages of Second Embodiment

In the second embodiment, the following advantages are obtained.

In the second embodiment, as described above, in a step of the trained model creation method to determine whether or not the region is erroneously estimated, it is determined whether or not the region estimated to be a low-occurrence detection target having an occurrence frequency equal to or less than the predetermined threshold and included in the detection target in the inference result data 84 is erroneously estimated. Accordingly, the region estimated to be the low-occurrence detection target and determined to be erroneously estimated can be specified as the noise region 60. The influence of the noise region 60 on the detection accuracy of the detection target becomes significant when the occurrence frequency of the detection target is low, and thus a decrease in the detection accuracy of the detection target can be further reduced or prevented.

In the second embodiment, as described above, the low-occurrence detection target includes an abnormal cell. Accordingly, the noise region 60 can be specified based on the region erroneously estimated to be an abnormal cell region, and thus a decrease in the detection accuracy of an abnormal cell, which is a low-occurrence detection target, can be further reduced or prevented.

In the second embodiment, as described above, the trained model creation method further includes a step of acquiring the occurrence frequency of the detection target included in the training data 86, and a step of notifying the user that the low-occurrence detection target is included when the low-occurrence detection target is included in the detection target based on the acquired occurrence frequency of the detection target included in the training data 86. Accordingly, the user can be prompted to add the first teacher image data 86b labeled with the first label 61 indicating a low-occurrence detection target. Therefore, a decrease in the detection accuracy of the detection target due to the noise region that becomes noticeable when the occurrence frequency of the detection target is low can be further reduced or prevented.

In the second embodiment, as described above, in a step of creating a trained model, a trained model 50 is created based on the training data 86 to which the training data 86 including the low-occurrence detection target has been added. Accordingly, a decrease in the detection accuracy of the detection target due to the noise region 60 that becomes noticeable when the occurrence frequency of the detection target is low can be further reduced or prevented.

The remaining advantages of the second embodiment are similar to those of the first embodiment.

Modified Examples

The embodiments disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

For example, while the example in which the inference process executor 11b executes the inference process (step S3), and determines whether or not the region estimated to be a detection target in the inference result data 84 is erroneously estimated (step S5) has been shown in the aforementioned first embodiment, the present invention is not limited to this. For example, the display 21 of the computer 20 may display the erroneously estimated region in the inference result data 84 after the inference process is executed and before it is determined whether or not the region is erroneously estimated. For example, the image processor 11c may extract a region erroneously estimated to be a detection target region and surrounded by a background region from the inference result data 84, and cause the display 21 of the computer 20 to display the extracted region as a specific example of the noise region 60. Thus, the user can visually recognize a specific example of the noise region 60, and therefore can specify the noise region 60 more efficiently.

When causing the display 21 of the computer 20 to display the erroneously estimated region in the inference result data 84, the image processor 11c may cause the display 21 of the computer 20 to display an erroneously estimated region that satisfies preset conditions regarding at least one of an aspect ratio, an exclusive area, or shape complexity. Thus, the user can visually recognize a specific example that is easily recognized as the noise region 60, and therefore can specify the noise region 60 more efficiently. The conditions regarding an aspect ratio, an exclusive area, and shape complexity can be set as appropriate depending on the detection target, and are not particularly limited. The shape complexity may be set based on the circumferential length and exclusive area of the noise region 60, or may be set based on other conditions.

When causing the display 21 of the computer 20 to display the erroneously estimated region in the inference result data, the image processor 11c may label, with the third label 63, a region of the second teacher image data 87b that corresponds to the extracted noise region 60 in the inference result data 84. Thus, the user can visually recognize a specific example of the third label 63 in the noise region 60.

While the example in which in the processed image 82 (see FIG. 5) output using the re-created trained model 55, the region 64a correctly appears as the noise region 60 has been shown in the aforementioned first embodiment, the present invention is not limited to this. A processed image 82 output using a re-created trained model 55 shown in FIG. 8 corresponds to the processed image 82 output using the updated trained model 50 shown in FIG. 5, except that an indication of a noise region 60 is not made. As a result of relearning the noise region 60, a decrease in the detection accuracy of the detection target due to the noise region 60 can be reduced or prevented, but depending on an image analysis target, it may be better for the user not to cause the noise region 60 to appear in the processed image 82, and an analytical image that does not degrade the discriminability may be obtained. Therefore, it is not necessary to make an indication of the noise region 60 in the processed image 82, as shown in FIG. 8.

While the example in which it is determined whether or not the region estimated to be a detection target in the inference result data 84 output by the inference process is erroneously estimated has been shown in the aforementioned first embodiment, the present invention is not limited to this. For example, it may be determined whether or not a region estimated to be a background in the inference result data 84 output by the inference process is erroneously estimated.

While the example in which the low-occurrence detection target includes an "abnormal cell" has been shown in the aforementioned second embodiment, the present invention is not limited to this. For example, the low-occurrence detection target may include a "normal cell".

While the example in which the image processor 11c creates the subtraction image data 83, and the server 10 (controller 11) transmits the created subtraction image data 83 and the inference result data 84 to the computer has been shown in the first embodiment, the present invention is not limited to this. For example, the image processor 11c may further create overlay image data (not shown) in which a correct region label is overlaid on the inference result data 84 based on the created subtraction image data 83, and the server 10 (controller 11) may transmit the created subtraction image data 83 and the overlay image data to the computer 20.

While the example in which the process operations in step S5 to step S10 and step S12 of the process for the machine learning, the inference process, and the machine learning (relearning) are performed by the user has been shown in the first embodiment, the present invention is not limited to this. All of the process operations in step S5 to step S10 and step S12 may be performed by the server 10 (controller 11), or any of the process operations in step S5 to step S10 and step S12 may be performed by the user, and the remaining process operations may be performed by the server 10 (controller 11).

ASPECTS

It will be appreciated by those skilled in the art that the exemplary embodiments described above are specific examples of the following aspects.

(Item 1)

A trained model creation method using machine learning used to perform a segmentation process on a cell image, the trained model creation method comprising:

creating a trained model based on training data including first input image data and first teacher image data that corresponds to the first input image data and is labeled with at least a first label indicating a detection target and a second label indicating a background;

executing an inference process using a created trained model using inference process data including second input image data;

determining whether or not a region estimated to be the detection target or the background in inference result data output by the inference process is erroneously estimated;

specifying a noise region not falling under the first label or the second label from among estimated regions determined to be erroneously estimated;

determining the noise region included in the first teacher image data;

further labeling a region determined as the noise region in the first teacher image data with a third label indicating the noise region and updating the first teacher image data; and re-creating the trained model based on updated training data including updated first teacher image data and the first input image data.

(Item 2)

The trained model creation method according to item 1, further comprising:

Creating, as image data for extracting a region erroneously estimated in the inference result data, subtraction image data indicating a difference between second teacher image data included in the inference process data and labeled with at least the first label and the second label and the inference result data corresponding to the second teacher image data after the executing the inference process and before the determining whether or not the region is erroneously estimated.

(Item 3)

The trained model creation method according to item 2, wherein the creating the subtraction image data includes creating the subtraction image data in which a first region labeled with the first label in both the second teacher image data and the inference result data among corresponding regions of the second teacher image data and the inference result data, a second region labeled with the second label in the second teacher image data and labeled with the first label in the inference result data among the corresponding regions of the second teacher image data and the inference result data, and a third region labeled with the first label in the second teacher image data and labeled with the second label in the inference result data among the corresponding regions of the second teacher image data and the inference result data identifiably appear.

(Item 4)

The trained model creation method according to any one of items 1 to 3, wherein the noise region is at least one but not all of regions erroneously estimated.

(Item 5)

The trained model creation method according to any one of items 1 to 4, wherein the re-creating the trained model includes re-creating the trained model based on the updated training data to which, in addition to the updated training data, the training data including the first input image data and the first teacher image data labeled with the third label has been further added.

(Item 6)

The trained model creation method according to any one of items 1 to 5, further comprising:

displaying, on a display, the region erroneously estimated in the inference result data after the executing the inference process and before the determining whether or not the region is erroneously estimated.

(Item 7)

The trained model creation method according to item 6, wherein the displaying, on the display, the region erroneously estimated includes displaying, on the display, the region erroneously estimated and satisfying a preset condition regarding at least one of an aspect ratio, an exclusive area, or shape complexity.

(Item 8)

The trained model creation method according to any one of items 1 to 7, wherein the determining whether or not the region is erroneously estimated includes determining whether or not a region estimated to be a low-occurrence detection target having an occurrence frequency equal to or less than a predetermined threshold and included in the detection target in the inference result data is erroneously estimated.

(Item 9) The trained model creation method according to item 8, wherein the low-occurrence detection target includes an abnormal cell.

(Item 10)

The trained model creation method according to item 9, further comprising:

acquiring an occurrence frequency of the detection target included in the training data before the creating the trained model; and notifying a user that the low-occurrence detection target is included when the low-occurrence detection target is included in the detection target based on an acquired occurrence frequency of the detection target.

(Item 11)

The trained model creation method according to item 10, wherein the creating the trained model includes creating the trained model based on the training data to which the training data including the low-occurrence detection target has been added.

(Item 12)

A trained model creation system using machine learning used to perform a segmentation process on a cell image, the trained model creation system comprising:

a storage to store training data including first input image data and first teacher image data that corresponds to the first input image data and is labeled with at least a first label indicating a detection target and a second label indicating a background, and inference process data including at least second input image data;

a trained model creator to create a trained model based on the training data acquired by the storage; and an inference process executor to execute an inference process using a created trained model using the inference process data stored in the storage; wherein the storage is operable to further store updated training data including updated first teacher image data in which a noise region included in the first teacher image data and corresponding to a noise region not falling under the first label or the second label among regions erroneously estimated to be detection targets in inference result data output by the inference process executor has been further labeled with a third label indicating the noise region, and the first input image data; and the trained model creator is operable to re-create the trained model based on the updated training data stored in the storage.

DESCRIPTION OF REFERENCE NUMERALS

11a: trained model creator
11b: inference process executor
12: storage
50: trained model
55: re-created trained model
60: noise region
61: first label
62: second label
63: third label
66: first region
67: second region
68: Third region
83: subtraction image data 84: inference result data
86: training data
86a: first input image data
86b: first teacher image data
87: inference process data
87a: second input image data
87b: second teacher image data
88: updated training data
88a: updated first teacher image data
100: trained model creation system

The invention claimed is:

1. A trained model creation method using machine learning used to perform a segmentation process on a cell image, the trained model creation method comprising:

creating a trained model based on training data including first input image data and first teacher image data that corresponds to the first input image data and is labeled with at least a first label indicating a detection target and a second label indicating a background;

executing an inference process of inputting second input image data into the created trained model and outputting inference result data;

determining whether or not a region estimated to be the detection target in the inference result data output by the inference process is erroneously estimated, based on the inference result data and second teacher image data that corresponds to the second input image data and is labeled with at least the first label and the second label;

specifying one or more first noise regions in which the estimated region is determined to be erroneously estimated;

determining one or more second noise regions corresponding to the one or more first noise regions in the first teacher image data;

further labeling the one or more second noise regions in the first teacher image data with a third label, which is a different type from the first label and the second label, indicating a noise region and updating the first teacher image data; and re-creating a trained model based on updated training data including the updated first teacher image data and the first input image data.

2. The trained model creation method according to claim 1, further comprising:

creating, as image data for extracting the region erroneously estimated in the inference result data, subtraction image data indicating a difference between the second teacher image data and the inference result data corresponding to the second teacher image data after the executing the inference process and before the determining whether or not the region is erroneously estimated.

3. The trained model creation method according to claim 2, wherein the creating the subtraction image data includes creating the subtraction image data in which a first region labeled with the first label in both the second teacher image data and the inference result data among corresponding regions of the second teacher image data and the inference result data, a second region labeled with the second label in the second teacher image data and labeled with the first label in the inference result data among the corresponding regions of the second teacher image data and the inference result data, and a third region labeled with the first label in the second teacher image data and labeled with the second label in the inference result data among the corresponding regions of the second teacher image data and the inference result data identifiably appear.

4. The trained model creation method according to claim 1, wherein the one or more first noise regions are not all of regions erroneously estimated.

5. The trained model creation method according to claim 1, wherein the re-creating the trained model includes re-creating the trained model based on the updated training data to which, in addition to the updated training data, training data including the first input image data and the first teacher image data labeled with the third label has been further added.

6. The trained model creation method according to claim 1, further comprising:

displaying, on a display, the region erroneously estimated in the inference result data after the executing the inference process and before the determining whether or not the region is erroneously estimated.

7. The trained model creation method according to claim 6, wherein the displaying, on the display, the region erroneously estimated includes displaying, on the display, the region erroneously estimated and satisfying a preset condition regarding at least one of an aspect ratio, an exclusive area, or shape complexity.

8. The trained model creation method according to claim 1, wherein the determining whether or not the region is erroneously estimated includes determining whether or not a region estimated to be a low-occurrence detection target having an occurrence frequency equal to or less than a predetermined threshold and included in the detection target in the inference result data is erroneously estimated.

9. The trained model creation method according to claim 8, wherein the low-occurrence detection target includes an abnormal cell.

10. The trained model creation method according to claim 9, further comprising:

acquiring an occurrence frequency of the detection target included in the training data before the creating the trained model; and notifying a user that the low-occurrence detection target is included when the low-occurrence detection target is included in the detection target based on an acquired occurrence frequency of the detection target.

11. The trained model creation method according to claim 10, wherein the creating the trained model includes creating the trained model based on the training data to which the training data including the low-occurrence detection target has been added.

12. A trained model creation system using machine learning used to perform a segmentation process on a cell image, the trained model creation system comprising:

a storage to store training data including first input image data and first teacher image data that corresponds to the first input image data and is labeled with at least a first label indicating a detection target and a second label indicating a background, second input image data and second teacher image data that corresponds to the second input image data and is labeled with the first label and the second label;

a trained model creator to create a trained model based on the training data acquired by the storage; and an inference process executor to execute an inference process of inputting the second input image data stored in the storage into the created trained model and outputting inference result data; wherein the storage is operable to further store updated training data including updated first teacher image data in which one or more second noise regions in the first teacher image data are further labeled with a third label indicating a noise region, which is a different type label from the first label and the second label, and the first input image data, the one or more second noise regions corresponding to specified one or more first noise regions, the one or more first noise regions in the inference result data which are determined to be erroneously estimated as detection targets based on the inference result data and the second teacher image data; and the trained model creator is operable to re-create a trained model based on the updated training data stored in the storage.

\* \* \* \* \*